US011010153B2

(12) United States Patent
Yagi

(10) Patent No.: US 11,010,153 B2
(45) Date of Patent: May 18, 2021

(54) INFORMATION PROCESSING APPARATUS THAT DETECTS FALSIFICATION OF A PROGRAM, METHOD OF CONTROLLING THE SAME, AND STORAGE MEDIUM

(71) Applicant: CANON KABUSHIKI KAISHA, Tokyo (JP)

(72) Inventor: Yuichi Yagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/427,409

(22) Filed: May 31, 2019

(65) Prior Publication Data
US 2019/0384588 A1 Dec. 19, 2019

(30) Foreign Application Priority Data
Jun. 13, 2018 (JP) .............................. JP2018-113101

(51) Int. Cl.
G06F 8/65 (2018.01)
H04N 1/00 (2006.01)
(52) U.S. Cl.
CPC ........... *G06F 8/65* (2013.01); *H04N 1/00384* (2013.01)
(58) Field of Classification Search
CPC ............................. G06F 8/65; H04N 1/00384
USPC ................................................. 717/168–178
See application file for complete search history.

(56) References Cited

U.S. PATENT DOCUMENTS

| 4,868,877 A | * | 9/1989 | Fischer | G06F 21/33 713/157 |
| 4,933,969 A | * | 6/1990 | Marshall | G06F 21/64 340/5.74 |
| 6,009,524 A | * | 12/1999 | Olarig | G06F 21/445 709/225 |
| 6,330,670 B1 | * | 12/2001 | England | G06F 9/4406 713/2 |
| 6,978,017 B2 | * | 12/2005 | Wiener | H04L 9/0891 380/278 |
| 7,069,452 B1 | * | 6/2006 | Hind | G06F 21/572 713/1 |
| 7,350,204 B2 | * | 3/2008 | Lambert | G06F 21/51 717/172 |

(Continued)

FOREIGN PATENT DOCUMENTS

JP 2008244992 A 10/2008

OTHER PUBLICATIONS

Collberg et al, "Distributed Application Tamper Detection Via Continuous Software Updates", ACM, pp. 319-328 (Year: 2012).*

(Continued)

*Primary Examiner* — Anil Khatri
(74) *Attorney, Agent, or Firm* — Rossi, Kimms & McDowell LLP

(57) ABSTRACT

A method of controlling an information processing apparatus and an information processing apparatus are provided. The information processing apparatus detects whether or not a control program stored in a storage has been falsified, updates the control program to a valid control program in accordance with a detection of the detecting unit that the control program has been falsified, and initializes setting data set in the information processing apparatus in accordance with an update of the control program.

12 Claims, 5 Drawing Sheets

(56) References Cited

U.S. PATENT DOCUMENTS

| | | | | |
|---|---|---|---|---|
| 7,630,381 | B1* | 12/2009 | Roskind | G06F 8/65 370/395.42 |
| 7,689,981 | B1* | 3/2010 | Gustafson | G06F 11/1004 717/168 |
| 7,925,898 | B2* | 4/2011 | Shear | G06Q 20/12 713/194 |
| 8,103,878 | B2* | 1/2012 | Kawamae | G06F 21/64 713/165 |
| 8,175,269 | B2* | 5/2012 | Pilipchuk | H04L 9/088 380/45 |
| 8,543,543 | B2* | 9/2013 | Marcelais | G06F 16/137 707/634 |
| 8,612,742 | B2* | 12/2013 | Hirabayashi | G06F 21/51 713/150 |
| 8,806,579 | B1* | 8/2014 | Angus | G06F 21/6218 726/4 |
| 8,856,532 | B2* | 10/2014 | Boyer | H04L 9/3247 713/175 |
| 8,887,288 | B2* | 11/2014 | Yoshida | G06F 21/34 726/26 |
| 8,892,862 | B2* | 11/2014 | Nicolson | H04L 9/3268 713/2 |
| 8,935,530 | B2* | 1/2015 | Hashimoto | H04W 12/1208 713/168 |
| 9,276,752 | B2* | 3/2016 | Abraham | H04L 9/3247 |
| 9,983,976 | B1* | 5/2018 | Gonzalez | G06F 11/3604 |
| 10,033,761 | B2* | 7/2018 | Akiyama | G06F 21/55 |
| 10,325,084 | B1* | 6/2019 | Larimer | H04L 63/0876 |
| 10,469,480 | B2* | 11/2019 | Kumar | H04L 9/0637 |
| 10,509,568 | B2* | 12/2019 | Hashimoto | G06F 3/0673 |
| 2008/0244554 | A1* | 10/2008 | Kadashevich | G06F 21/572 717/168 |

OTHER PUBLICATIONS

Denning, "An Intrusion-Detection Model", IEEE, pp. 222-332 (Year: 1987).*

Lu et al, "Structural Digital Signature for Image Authentication: An Incidental Distortion Resistant Scheme", IEEE, pp. 161-173 (Year: 2003).*

Hahn et al, "Searchable Encryption with Secure and Efficient Updates", ACM, pp. 310-320 (Year: 2014).*

Kim et al, "Forward Secure Dynamic Searchable Symmetric Encryption with Efficient Updates", ACM, pp. 1449-1463 (Year: 2017).*

Nahabedian et al, "Assured and Correct Dynamic Update of Controllers", ACM, pp. 96-107 (Year: 2016).*

Li et al, "Enabling Efficient Updates in KV Storage via Hashing: Design and Performance Evaluation", ACM, pp. 1-29 (Year: 2019).*

Wu et al, "On the Security of Data Access Control for Multiauthority Cloud Storage Systems", IEEE, pp. 258-272 (Year: 2017).*

* cited by examiner

INFORMATION PROCESSING APPARATUS THAT DETECTS FALSIFICATION OF A PROGRAM, METHOD OF CONTROLLING THE SAME, AND STORAGE MEDIUM

BACKGROUND OF THE INVENTION

Field of the Invention

The present invention relates to an information processing apparatus, a method of controlling the information processing apparatus, and a storage medium.

Description of the Related Art

By attacking to vulnerabilities in software, attacks that falsify software and exploit computers have been problematic. As a countermeasure against such attacks, Japanese Patent Laid-Open No. 2008-244992, for instance, proposes a method of detecting falsification by calculating and storing a hash value of a program using a tamper resistant module, and recalculating the hash value of the program each time the program is started to verify the program.

In a case where the falsification of a program is detected using the technique described in Japanese Patent Laid-Open No. 2008-244992, the program is rewritten to restore the information processing apparatus. With this rewriting of the program, the security of the program can be ensured. However, because the falsified program is temporarily in operation, setting data and the like of the information processing apparatus may be illegally changed, and thus the rewriting of the program alone does not necessarily ensure the security of the information processing apparatus.

SUMMARY OF THE INVENTION

An aspect of the present invention is to eliminate the above-mentioned problem with conventional technology.

A feature of the present invention is to provide a technique for detecting the falsification of a program and, upon restoration by the rewriting of the program, ensuring the security of setting data.

According to a first aspect of the present invention, there is provided an information processing apparatus, comprising: a storage; a memory device that stores a program; and at least one processor that executes the program stored in the memory device to cause the information processing apparatus to function as: a detecting unit configured to detect whether or not a control program stored in the storage has been falsified, an updating unit configured to update the control program to a valid control program in accordance with a detection of the detecting unit that the control program has been falsified, and an initializing unit configured to initialize setting data set in the information processing apparatus in accordance with an update of the control program by the updating unit.

According to a second aspect of the present invention, there is provided a method of updating a falsified program in an information processing apparatus provided with a storage, the method comprising: detecting whether or not a control program stored in the storage has been falsified; updating the control program to a valid control program in a case where it is detected in the detecting that the control program has been falsified; and initializing setting data set in the information processing apparatus in accordance with an update of the control program in the updating.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Exemplary Embodiment

Figure 1:
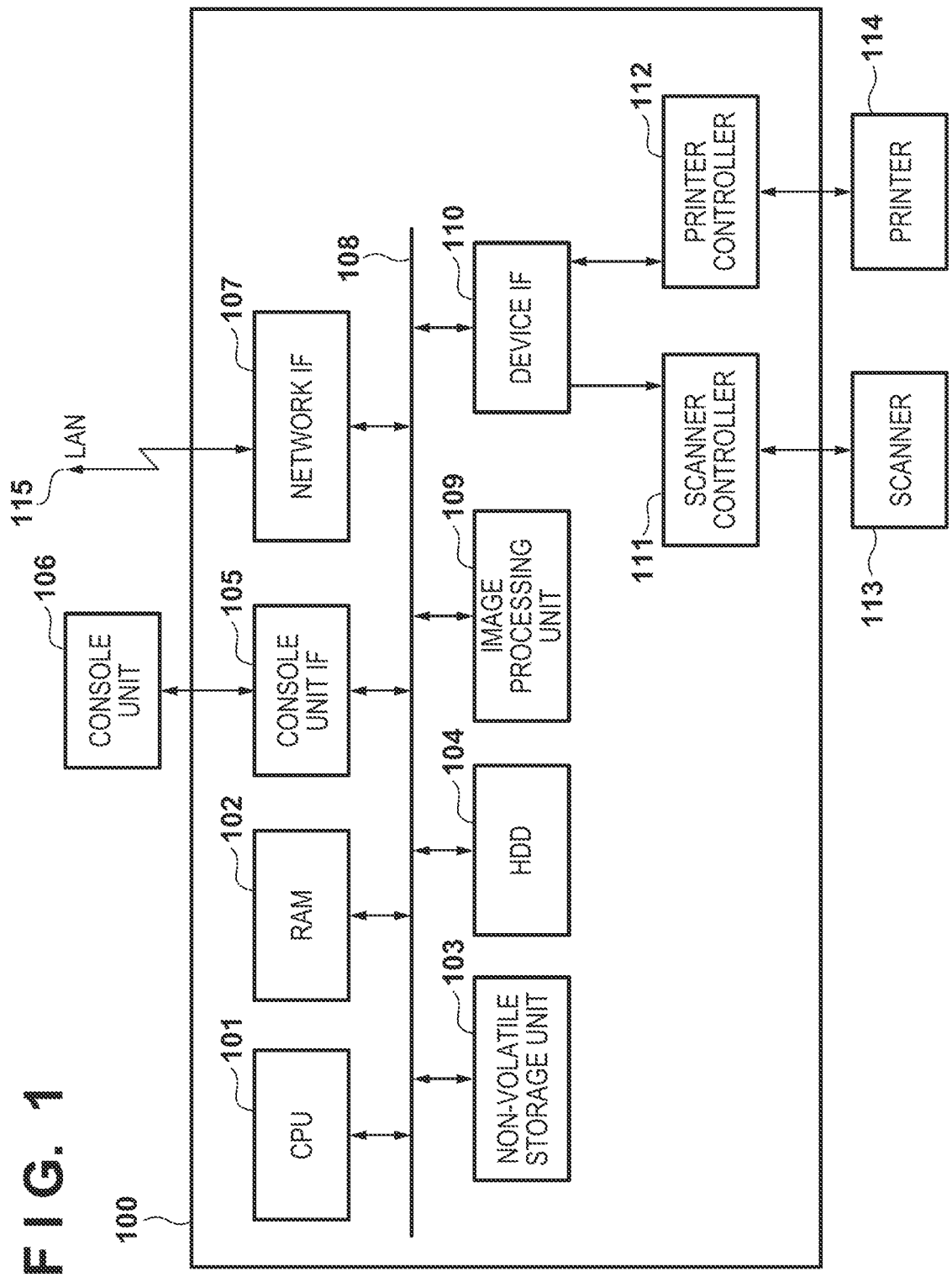
FIG. 1 is a block diagram for explaining a configuration of an information processing apparatus according to a first exemplary embodiment.

FIG. 1 is a block diagram for explaining a configuration of an information processing apparatus according to the first exemplary embodiment.

The information processing apparatus according to the exemplary embodiment is implemented as, for instance, a so-called multifunction-peripheral (MFP) in which a plurality of functions, such as a scanning function and a printing function, are integrated. This information processing apparatus includes a controller unit (controller) 100 for controlling the entire device, a scanner 113, a printer 114, and a console unit 106. The scanner 113 optically reads an image of an original document and outputs image data corresponding to the image. The printer 114 prints an image on a recording medium (sheet) such as a piece of paper on the basis of the image data output from the controller 100. The console unit 106 includes a numeric keypad, various hard keys, and the like for receiving input such as an instruction for job execution from a user and the like, and further includes a display panel for displaying device information, job progress information, and the like to the user, or a settings screen for functions executable by the information processing apparatus.

The scanner 113 and the printer 114 are connected to a scanner controller 111 and a printer controller 112 included in the controller 100, respectively. The console unit 106 is connected to a console unit interface (I/F) 105 included in the controller 100. With such a configuration, the scanner controller 111, the printer controller 112, and the console unit 106 each operate while controlled by the controller 100.

Figure 2:
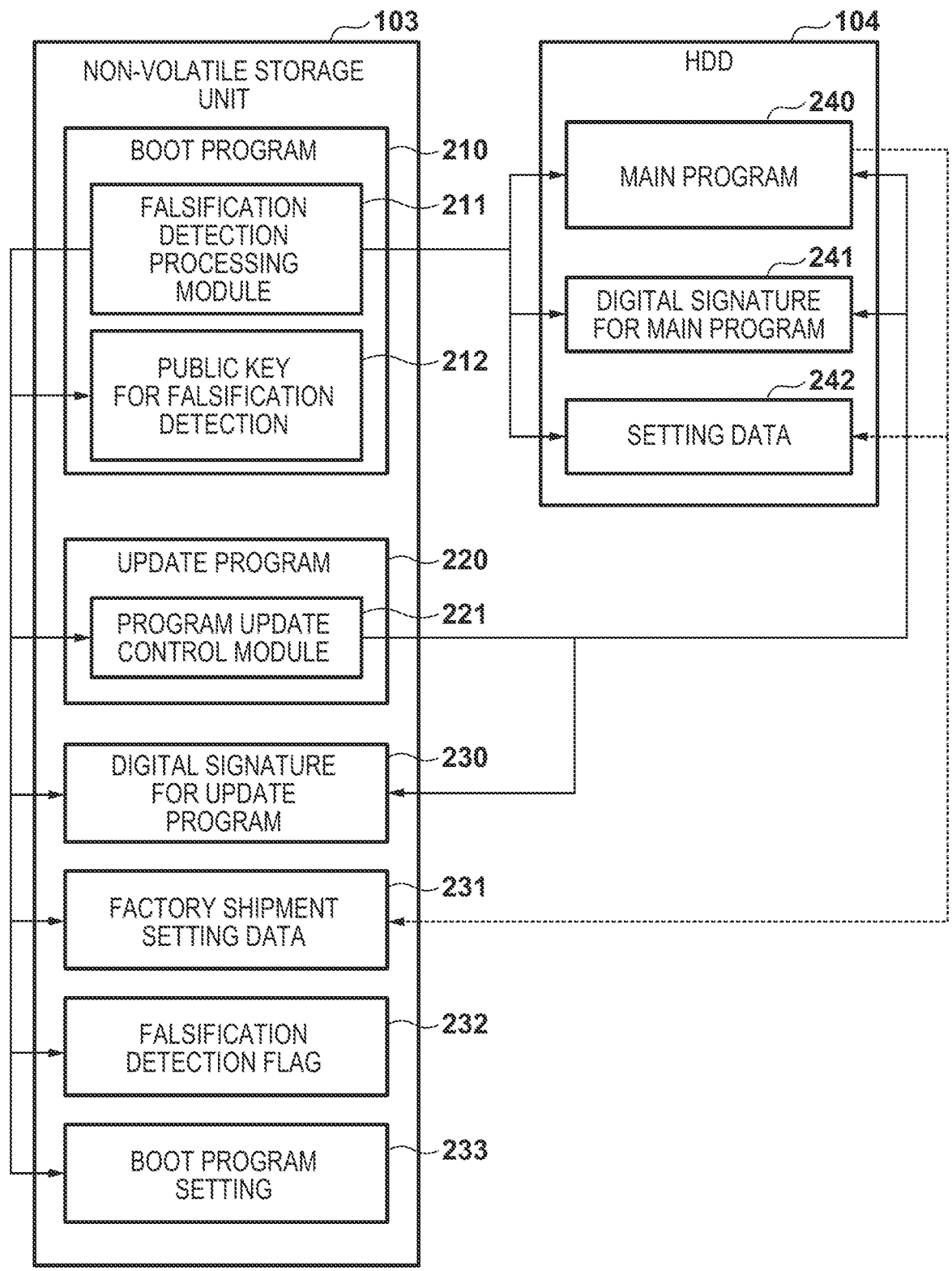
FIG. 2 is a diagram for explaining programs and data stored in a non-volatile storage unit and an HDD of the information processing apparatus according to the first exemplary embodiment.

The controller 100 includes a central processing unit (CPU) 101 for comprehensively controlling each unit of the information processing apparatus. The CPU 101 is connected to a random access memory (RAM) 102, a non-volatile storage unit 103, a hardware disk drive (HDD) 104, the console unit I/F 105, and a network I/F 107 via a system bus 108. The RAM 102 is a general-purpose RAM and serves as a memory for providing a storage area and a work area for programs of the CPU 101. Further, the RAM 102 is also used as a memory for temporarily storing parameters, setting data, and the like, and an image memory for storing image data in predetermined units, such as pages. The non-volatile storage unit 103 is a general-purpose non-volatile memory, such as, for instance, flash memory, and as illustrated in FIG. 2, for example, stores a boot program 210, an update program 220 for updating each program, and factory shipment setting data 231 obtained by copying setting data 242 described later before factory shipment and the like. The HDD 104 stores a main program (control program) 240, the setting data 242, image data, tables, and the like. The functions of the information processing apparatus are implemented by, for instance, the CPU 101 executing the boot program 210 stored in the non-volatile storage unit 103, and the boot program 210 deploying the update program 220 or the main program 240 to the RAM 102 and executing the deployed program.

The console unit I/F 105 is an interface for inputting and outputting information with the console unit 106. The console unit I/F 105 outputs the display data to the console unit 106 in accordance with an instruction from the CPU 101 and transmits information input by the user on the console unit 106 to the CPU 101. The network I/F 107 is connected to a local area network (LAN) 115 of wired or wireless media and enables input and output of information between the information processing apparatus and devices on the LAN 115. The network I/F 107 has a configuration corresponding to the LAN 115 and may have, for instance, a configuration corresponding to near field communication with a wireless range of tens of cm. In such a case, communication is performed with a mobile wireless terminal.

An image processing unit 109 performs general-purpose image processing and performs processing such as scaling, rotation, conversion, and the like on image data externally obtained via the LAN 115, for instance. Further, the image processing unit 109 performs processing for rendering a program design language (PDL) code received via the LAN 115 to bitmap data. Additionally, when printing is performed using the printer 114 via the printer controller 112, the image processing unit 109 performs processing for formatting the image data compressed, encoded, and stored in the HDD 104 into a format capable of being processed by the printer controller 112. A device I/F 110 is connected to the scanner 113 and the printer 114 via the scanner controller 111 and the printer controller 112, respectively converts image data between synchronous and asynchronous, and transmits setting data, adjustment values, and the like. The device I/F 110 also transmits status information of the scanner 113 and the printer 114 to the CPU 101. The status information includes, for instance, error information such as a jam that occurred in the scanner 113 or the printer 114.

The scanner controller 111 performs various processing corresponding to scanning functions such as fixing, modification, region separation, magnification, binarization, and the like, on the image data read and input by the scanner 113. The scanner 113 includes an auto document feeder and a reading unit through platen (not illustrated) and can read an original document placed on a document glass platform, both sides of a plurality of original documents, and the like. The scanner 113 includes sensors configured to open and close a document cover (not illustrated) and detect the presence or absence of an original document, a size of an original document, and the like. The detection signals from these sensors and the status information of the scanner 113 are transmitted to the CPU 101 via the scanner controller 111 and the device I/F 110, and thus the CPU 101 can recognize conditions of the scanner 113, such as error occurrence and error recovery.

The printer controller 112 performs processing on the image data to be printed in accordance with print functions such as output correction corresponding to output characteristics of the printer 114, resolution conversion, and adjustment of the printing position of the image. The printer 114 includes at least one paper cassette for storing paper. Sensors are provided to the printer 114 for detecting the amount of paper remaining in each of the paper cassettes, the presence or absence of toner, and the like. The detection signals from the sensors and the status information of the printer 114 are transmitted to the CPU 101 via the printer controller 112 and the device I/F 110, and thus the CPU 101 can recognize conditions of the printer 114, such as error occurrence and error recovery.

FIG. 2 is a diagram for explaining programs and data stored in the non-volatile storage unit 103 and the HDD 104 of the information processing apparatus according to the first exemplary embodiment.

When the information processing apparatus is powered on, the CPU 101 executes the boot program 210 to perform startup processing. This boot program includes a falsification detection module 211 and a public key 212 (decryption key) for falsification detection. The public key 212 for falsification detection is a public key paired with a secret key used to create a digital signature 230 for the update program described later and a digital signature 241 for the main program. The secret key is, for instance, a secret key managed by the manufacturer of the information processing apparatus.

A program update control module 221 of the update program 220 obtains the main program 240, the update program 220, and the digital signatures paired with the main program and the update program respectively from an external device, a server on the Internet, or the like (not illustrated) and rewrites the main program 240, the update program 220, and the respective digital signature 241, 230 stored in the non-volatile storage unit 103 and the HDD 104.

The digital signature 230 for the update program is data obtained by calculating the hash value of the update program 220 using a publicly known hash function and encrypting the calculated hash value with the aforementioned secret key. The digital signature 230 for the update program is used by the falsification detection module 211 of the boot program 210 before the update program 220 has been deployed into the RAM 102 and the deployed program is executed. The falsification detection module 211 calculates the hash value of the update program 220 and further uses the public key 212 for falsification detection to decrypt the digital signature 230 for the update program to obtain a hash value. Then, the falsification detection module 211 determines whether or not the update program 220 is a valid program by determining whether or not the calculated hash value matches the hash value obtained by decryption.

The factory shipment setting data 231 is the setting data 242 described later stored before the manufacturer ships the information processing apparatus. A digital signature 230 of the factory shipment setting data 231 may be generated by calculating the hash value of the factory shipment setting data 231 using a publicly known hash function and encrypting the calculated hash value with the secret key. The digital signature 230 of the factory shipment setting data 231 is used by the falsification detection module 211 of the boot program 210 before the factory shipment setting data 231 has been deployed into the RAM 102 and the deployed data is executed. The falsification detection module 211 calculates the hash value of the factory shipment setting data 231 and further uses the public key 212 for falsification detection to decrypt the digital signature 230 of the factory shipment setting data 231 to obtain a hash value. Then, the falsification detection module 211 determines whether or not the factory shipment setting data 231 is a valid program by determining whether or not the calculated hash value matches the hash value obtained by decryption.

A falsification detection flag 232 is a flag that is set to ON ("1") for each program in a case where the falsification detection module 211 detects the falsification of the program. The falsification detection module 211 sets the falsification detection flag to OFF ("0") in a case that the validity of the program is confirmed with the falsification detection flag ON.

A boot program setting 233 is a setting used to determine whether the boot program 210 starts the update program 220 or starts the main program 240. When the program of the main program 240 is to be updated on the basis of an instruction from the user, the boot program setting 233 is set to the update program. Then, when the update program 220 completes the updating of the main program, the boot program setting 233 is set to the main program 240.

The main program 240 controls the controller 100, the console unit 106, the scanner 113, and the printer 114, and includes a copy processing module that implements copy functions, a print processing module that prints data sent from an external device, and the like. The main program 240 may include data such as language data for messages displayed on the console unit other than that of a program, or a color profile used for color adjustment of the print.

The digital signature 241 for the main program is data obtained by calculating the hash value of the main program 240 using a publicly known hash function and encrypting the calculated hash value with the aforementioned secret key. The digital signature 241 for the main program is used before the falsification detection module 211 of the boot program has deployed the main program 240 to the RAM 102 and executed the deployed program. The falsification detection module 211 calculates the hash value of the main program 240 and uses the public key 212 for falsification detection to decrypt the digital signature 241 for the main program to obtain a hash value. Then, the falsification detection module 211 determines whether or not the main program 240 is a valid program by whether the calculated hash value matches the hash value obtained by decryption.

The setting data 242 stores data necessary for the information processing apparatus to operate. For instance, any information on the information processing apparatus, such as a device specific serial number, a registration adjustment value for the printer 114, and an ID of a system administrator and a password set by the user, is stored.

Figure 3:
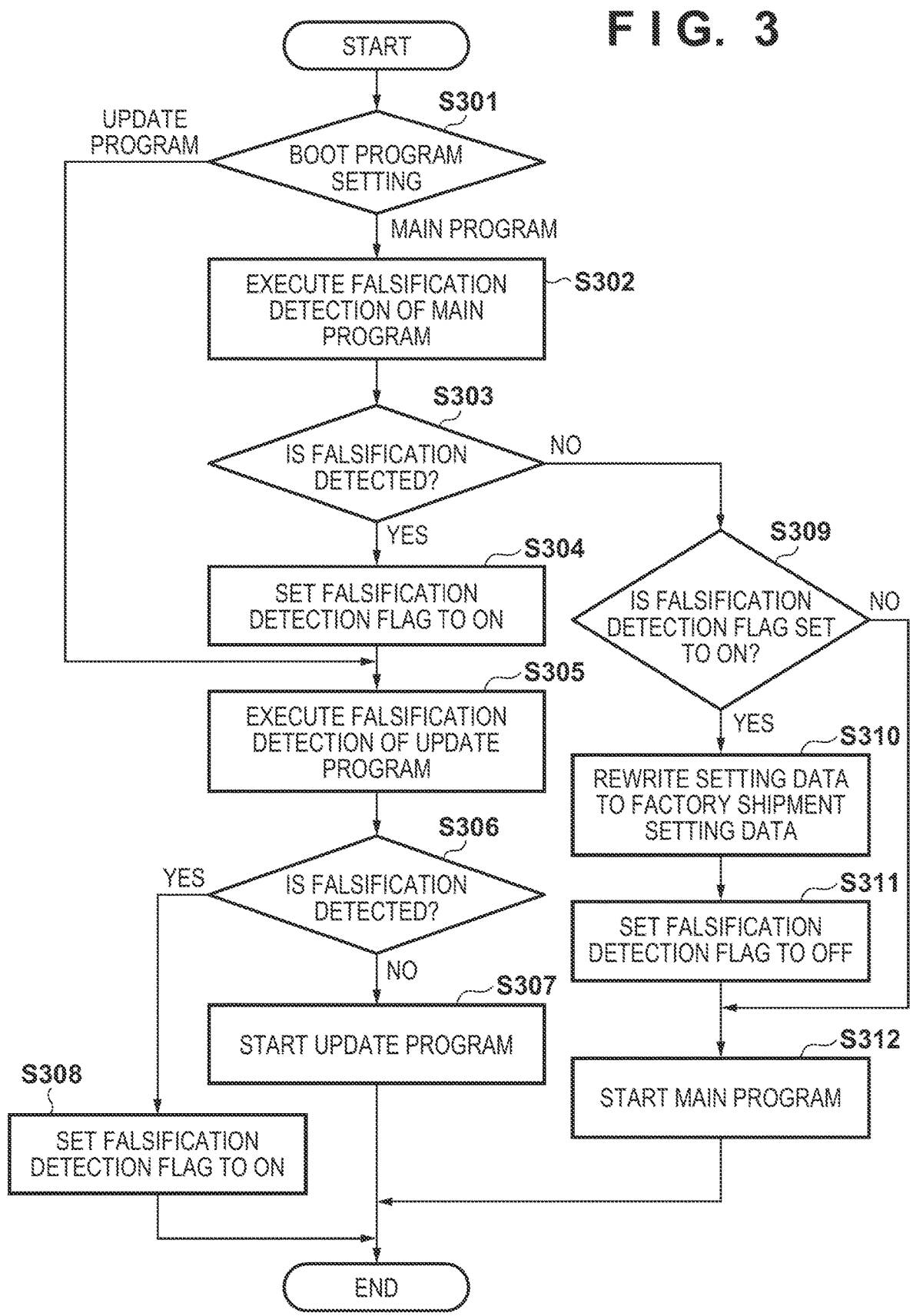
FIG. 3 is a flowchart for describing processing executed by the information processing apparatus according to the first exemplary embodiment.

FIG. 3 is a flowchart for describing processing executed by the information processing apparatus according to the first exemplary embodiment. The processing shown in this flowchart is implemented by the CPU 101 executing the update program 220 of the non-volatile storage unit 103, or executing the boot program 210 to deploy the program stored in the HDD 104 into the RAM 102 and executing the deployed program. Note that this processing is initiated by restarting the information processing apparatus when the information processing apparatus is powered on, after the update program 220 has rewritten the program, or the like.

First, in step S301, the CPU 101 determines a program to be started on the basis of the boot program setting 233. Here, the flow proceeds to step S302 when the main program 240 is configured to be started, and proceeds to step S305 when the update program 220 is configured to be started. In step S302, the CPU 101, with the falsification detection module 211, calculates the hash value of the main program 240 and further uses the public key 212 for falsification detection to decrypt the digital signature 241 for the main program to obtain a hash value. Then, the flow proceeds to step S303 where the CPU 101 determines whether or not the main program 240 is a valid program by whether the calculated hash value matches the hash value obtained by decryption. In other words, the step S303 is processing for verifying that the main program 240 is a valid program. Here, in accordance with a determination that the main program 240 has been falsified and is not a valid program, the flow proceeds to step S304. In accordance with a determination that the main program 240 is a valid program, that is, has not been falsified, the flow proceeds to step S309. In step S304, the CPU 101 sets the falsification detection flag 232 to ON ("1"), and the flow proceeds to step S305.

In step S305, the CPU 101 calculates the hash value of the update program 220 by the falsification detection module 211 and further uses the public key 212 for falsification detection to decrypt the digital signature 230 for the update program 220 to obtain a hash value. Then, the flow proceeds to step S306 where the CPU 101 determines whether or not the update program 220 is a valid program on the basis of whether the calculated hash value matches the hash value obtained by decryption. Here, in accordance with a determination that the update program 220 is not a valid program, that is, has been falsified, the flow proceeds to step S308. In accordance with a determination that the update program 220 is a valid program, that is, has not been falsified, the flow proceeds to step S307. In step S307, the CPU 101 deploys the update program 220 to the RAM 102 and starts the update program 220 to end the processing.

When the update program 220 is thus started, the main program 240 is downloaded from the external device or from a server on the Internet, which are aforementioned or the like, and updates the main program 240 that has been falsified with the valid main program. When the update of the main program 240 is thus completed, the boot program setting 233 is set to start the main program 240, and the information processing apparatus is restarted. Then, in this case, the processing proceeds from step S301→step S302→step S303→step S309. This processing is described later.

On the other hand, in a case that both the main program 240 and the update program 220 have been falsified, the flow proceeds to step S308 where the CPU 101 sets the falsification detection flag 232 to ON ("1") to end the processing. In this case, the user rewrites the update program 220 of the non-volatile storage unit 103 and the digital signature 230 for the update program to valid information. Then, the boot program setting 233 is set to start the update program 220, and the information processing apparatus is restarted. In this case, the processing proceeds from step S301→step S305→step S306→step S307. Then, when the update program 220 is started, the main program 240 is downloaded from the external device or a server on the Internet, which are aforementioned or the like, allowing the main program that has been falsified to be updated with the valid main program.

On the other hand, upon determination that the main program 240 is a valid program in step S303, the CPU 101 determines, in step S309, whether or not the falsification detection flag 232 is ON. Here, the flow proceeds to step S310 in accordance with a determination that the falsification detection flag 232 is ON ("1") or to step S312 in accordance with a determination that the falsification detection flag 232 is not ON. A state in which the falsification of the main program 240 is not detectable in step S303 and the falsification detection flag 232 is ON in step S309 indicates that the falsification of the main program 240 was detected and the falsified main program 240 was rewritten and restored. Accordingly, in this case, the flow proceeds to step S310 where the CPU 101 rewrites an area of the setting data 242 to the factory shipment setting data 231. That is, the setting data 242 is initialized to initial data. Then, the flow proceeds to step S311 where the CPU 101 sets the falsification detection flag 232 to OFF ("0"). Then, the flow proceeds to step S312 where the CPU 101 deploys the main program 240 into the RAM 102 and starts the main program 240 to end the processing.

As described above, according to the first exemplary embodiment, in a case where the falsification of a program is detected, the security of the information processing apparatus can be ensured by rewriting the setting data and the like to the initial data.

Second Exemplary Embodiment

In the first exemplary embodiment described above, the setting data 242 was automatically rewritten to the factory shipment setting data 231 in a case where the falsification of the program was detected, and the program was restored by rewriting the program. In contrast, in the second exemplary embodiment, an example is described in which the setting data 242 is not automatically rewritten, but rather the user is allowed to select whether or not to execute rewriting. Note that the hardware configuration and the like of the information processing apparatus according to the second exemplary embodiment are the same as those of the first exemplary embodiment described above, and thus descriptions thereof will be omitted.

Figure 4:
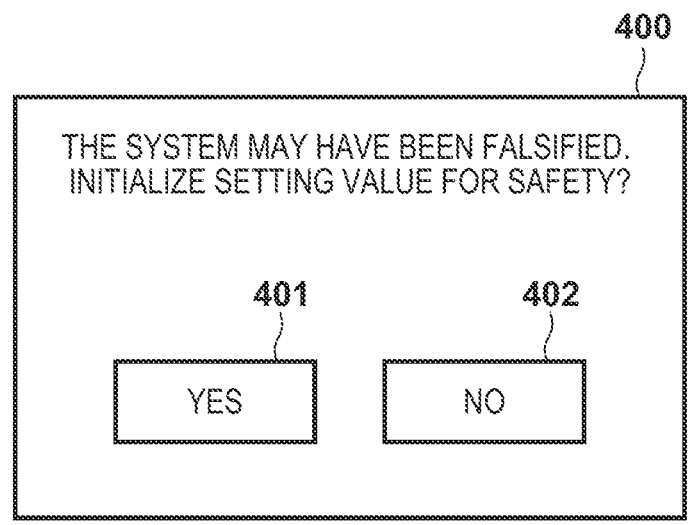
FIG. 4 is a diagram illustrating an example of a screen that is displayed on a console unit of the information processing apparatus according to a second exemplary embodiment and that allows a user to select whether to rewrite setting data to factory shipment setting data.

FIG. 4 is a diagram illustrating an example of a screen that is displayed on the console unit 106 of the information processing apparatus according to the second exemplary embodiment and allows a user to select whether or not to rewrite the setting data 242 to the factory shipment setting data 231.

In a case that the user selects a "Yes" 401 on this screen 400, the same processing as in the first exemplary embodiment is executed. On the other hand, in a case that the user selects a "No" 402, the main program 240 is started without the setting data 242 being rewritten to the factory shipment setting data 231.

Figure 5:
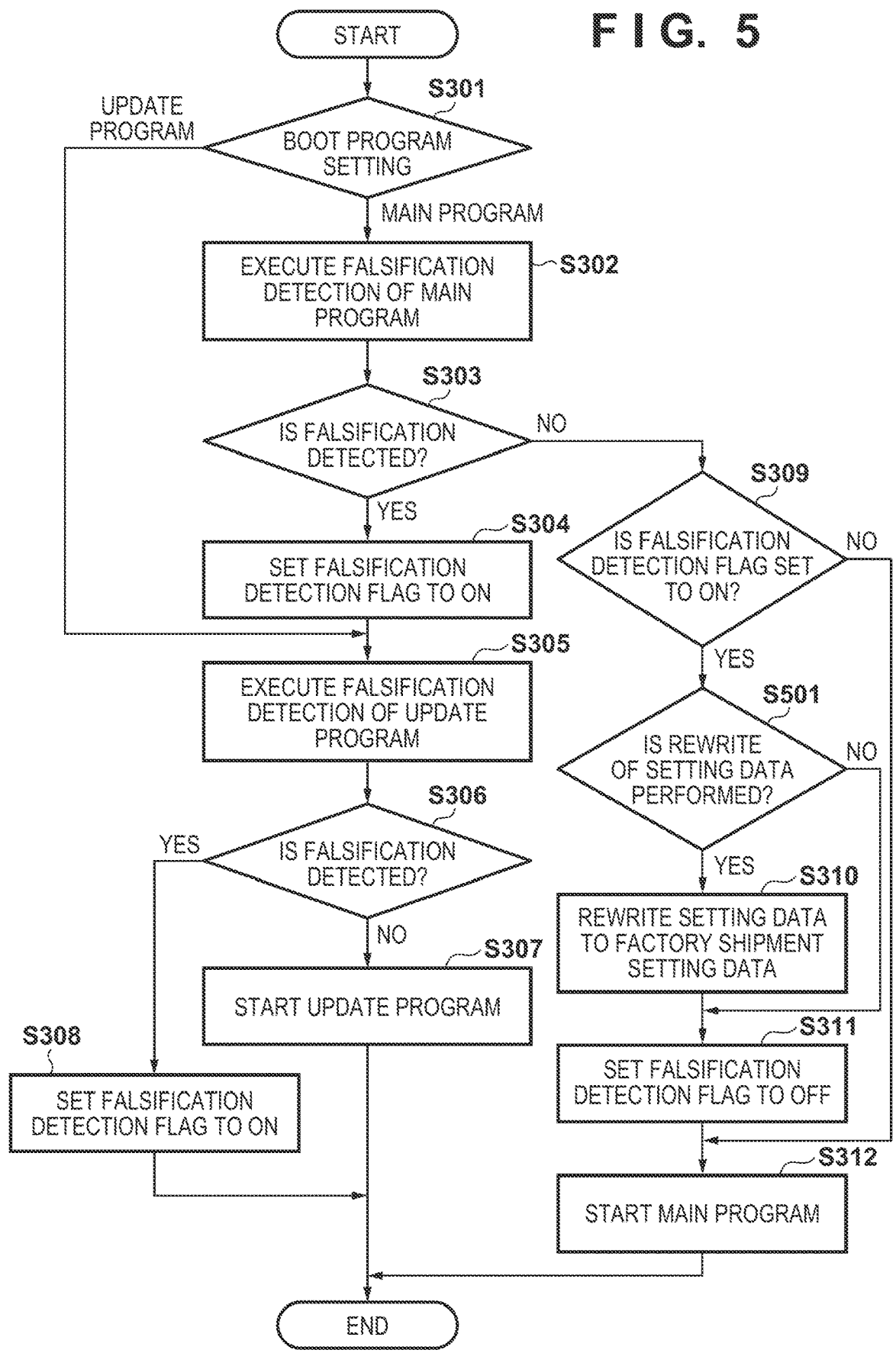
FIG. 5 is a flowchart for describing processing executed by the information processing apparatus according to the second exemplary embodiment.

FIG. 5 is a flowchart for explaining processing executed by the information processing apparatus according to the second exemplary embodiment. The processing illustrated in this flowchart is implemented by the CPU 101 executing the update program 220 of the non-volatile storage unit 103, or executing the boot program 210 to deploy the main program 240 stored in the HDD 104 into the RAM 102 and executing the deployed program. Note that this processing is initiated by restarting the information processing apparatus when the information processing apparatus is powered on, after the update program has rewritten the program, or the like. Note that, in FIG. 5, portions common to the flowchart of FIG. 3 described above are denoted by the same reference numerals, and descriptions thereof will be omitted.

In a case that the CPU 101 does not detect the falsification of the main program 240 in step S303, the flow proceeds to step S309 where the CPU 101 determines whether or not the falsification detection flag 232 is ON. Here, in a case that the falsification detection flag 232 is ON, the flow proceeds to step S501, and in a case that the falsification detection flag 232 is not ON, the flow proceeds to step S312. A state in which the falsification of the main program is not detected in step S303 and the falsification detection flag 232 is ON in step S309 indicates that the falsification of the main program 240 was detected and the falsified main program 240 was rewritten and restored. In step S501, as illustrated in FIG. 4, for instance, the CPU 101 displays the screen 400 for selecting whether or not the setting data 242 is to be rewritten to the factory shipment setting data 231 on the console unit 106 and accepts the selection result of the user. Here, in a case that the "Yes" 401 is selected, the flow proceeds to step S310 where the same processing as in the first exemplary embodiment described above is performed. On the other hand, in a case that the "No" 402 is selected, the flow skips step S310, proceeds to step S311 where the CPU 101 turns the falsification detection flag 232 to OFF ("0"), and then proceeds to step S312.

As described above, according to the second exemplary embodiment, it is possible to secure the security of the setting data in a case that the information processing apparatus detects the falsification of a program and restoration is achieved by rewriting the program. Furthermore, the user can select whether or not the setting data is to be rewritten to the setting data at the time of factory shipment, making it possible for the user to recognize whether or not the setting data has been rewritten to the setting data at the time of factory shipment.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-113101, filed Jun. 13, 2018, which is hereby incorporated by reference herein in its entirety.

What is claimed is:

1. An information processing apparatus, comprising:
a printer;
one or more memory devices that store a program; and
one or more processors that execute the program stored in the one or more memory devices to cause the information processing apparatus to:
determine whether or not a control program for controlling the printer, stored in the one or more memory devices, has been falsified;
store, in the one or more memory devices, information for indicating that the control program has been falsified in accordance with having determined that the control program has been falsified;
update the control program to another control program in accordance with having determined that the control program has been falsified, and
rewrite setting data which is set by a user and is used for an operation of the information processing apparatus with initial data generated prior to the setting data set by the user,
based on the information stored in the one or more memory devices, after the update of the control program has completed,
wherein, after an update of the control program has completed, rewriting of the setting data is executed in response to the information processing apparatus being started.

2. The information processing apparatus according to claim 1, wherein
the one or more memory devices further store a digital signature and a decryption key for the program, wherein
in a determination of whether the control program has been falsified, a first hash value is calculated from the program stored in the one or more memory devices, and a second hash value is obtained from the digital signature with the decryption key, and it is determined that the program has been falsified in a case where the first hash value and the second hash value do not match.

3. The information processing apparatus according to claim 1, wherein, in the rewriting of the setting data, the setting data set by the user_is rewritten to setting data at time of factory shipment of the information processing apparatus.

4. The information processing apparatus according to claim 1, wherein the one or more processors that execute the control program stored in the one or more memory devices causes the information processing apparatus to further:
allow a user to select whether or not to rewrite the setting data.

5. The information processing apparatus according to claim 1, wherein the control program includes a main program and an update program, and
wherein in the update of the control program, in a case that it is determined that the main program has been falsified and that the update program has not been falsified, the update program is executed to update the main program.

6. The information processing apparatus according to claim 5, wherein in the update of the control program, in a case that it is determined that the main program and the update program have both been falsified, the update program is updated to a valid update program and subsequently is executed the valid update program to update the main program.

7. The information processing apparatus according to claim 5, wherein in the update of the control program, in a case that the main program is to be updated, the update program is executed to download a main program from an external device or a server and to update the main program.

8. The information processing apparatus according to claim 5, wherein in the update of the control program, in a case that the update program is to be updated, the update program is updated to an update program at time of factory shipment of the information processing apparatus.

9. The information processing apparatus according to claim 1, wherein the control program includes a program for controlling a scanner.

10. The information processing apparatus according to claim 1, wherein the setting data is at least one of an ID of a system administrator and a password.

11. A method of updating a falsified program in an information processing apparatus having a printer, the method comprising:
determining whether or not a control program for controlling the printer, stored in a memory device, has been falsified;
storing, in the memory device, information for indicating that the control program has been falsified in accordance with having determined that the control program has been falsified;
updating the control program to another control program in a case where it is determined in the determining that the control program has been falsified; and
rewriting setting data which is set by a user and is used for an operation of the information processing apparatus with initial data generated prior to the setting data set by the user,
based on the information stored in the memory device, after an update of the control program in the updating has completed,
wherein, after an update of the control program has completed, rewriting of the setting data is executed in response to the information processing apparatus being started.

12. A non-transitory computer-readable storage medium storing a program for causing a processor to execute a method of updating a falsified program in an information processing apparatus having a printer, the method comprising:
determining whether or not a control program for controlling the printer, stored in a memory device, has been falsified;
storing, in the memory device, information for indicating that the control program has been falsified in accordance with having determined that the control program has been falsified;
updating the control program to another control program in a case where it is determined in the determining that the control program has been falsified; and rewriting setting data which is set by a user and is used for an operation of the information processing apparatus with initial data generated prior to the setting data set by the user,
based on the information stored in the memory device, after an update of the control program in the updating has completed,
wherein, after an update of the control program has completed, rewriting of the setting data is executed in response to the information processing apparatus being started.

* * * * *